United States Patent [19]

Kautt

[11] Patent Number: 5,022,143
[45] Date of Patent: Jun. 11, 1991

[54] WINDOW FRAME FINISHING INSTALLATION

[75] Inventor: Jean-Jacques Kautt, Strasbourg, France

[73] Assignee: Ferco International Usine de Ferrures de Batiment, Sarrebourg, France

[21] Appl. No.: 529,547

[22] Filed: May 29, 1990

[30] Foreign Application Priority Data

Jun. 1, 1989 [FR] France .................. 89 07240

[51] Int. Cl.⁵ ............................................ B23P 21/00
[52] U.S. Cl. .................................... 29/783; 29/791; 29/793
[58] Field of Search .................. 29/434, 771, 783, 791, 29/793

[56] References Cited

U.S. PATENT DOCUMENTS

| | | | |
|---|---|---|---|
| 3,516,117 | 6/1970 | Shockey | 29/783 X |
| 4,175,313 | 11/1979 | Neumann | 29/771 X |
| 4,697,337 | 10/1987 | Mühle | 29/791 X |
| 4,893,402 | 1/1990 | Hirasaka et al. | 29/771 |

FOREIGN PATENT DOCUMENTS 2203771  8/1973  Fed. Rep. of Germany .
3042284  6/1982  Fed. Rep. of Germany .
2212479  7/1974  France .
2534621  4/1984  France .
432860   9/1967  Switzerland .
2022664  12/1979  United Kingdom .

Primary Examiner—Timothy V. Eley
Assistant Examiner—C. Richard Martin
Attorney, Agent, or Firm—Fidelman & Wolffe

[57] ABSTRACT

The invention concerns an installation for finishing window frame assemblies starting from a bare opening frame and a bare fixed frame, each frame comprising grooves and shoulders to receive hardware, external seals, glazing unit spacers, glazing units, beading seals and beading. The installation is formed of two continuous lines of modular stations arranged in two parallel reference planes, the first comprising fixed frame finishing stations and the second comprising opening frame finishing stations. The opening frame finishing line is connected at its downstream end to the fixed frame finishing line by means of a storage and transfer station facing a station for assembling opening frames to fixed frames, itself located in the reference plane, together with the glazing unit fitting and fixing station and the beading fitting station.

17 Claims, 3 Drawing Sheets

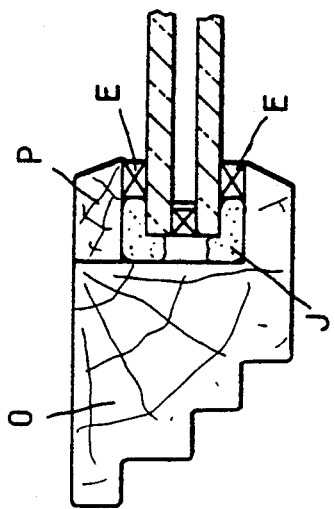
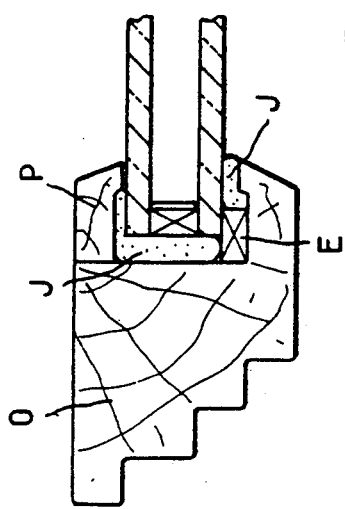
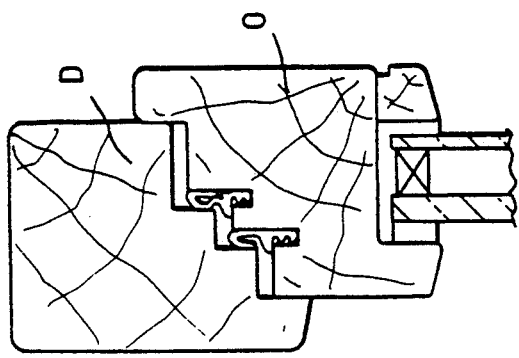
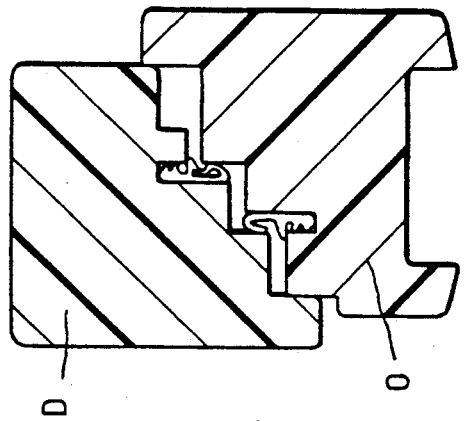

WINDOW FRAME FINISHING INSTALLATION

BACKGROUND OF THE INVENTION

1. Field of the Invention

The invention concerns an installation for finishing window frames, that is to say for fitting out and assembling together initially bare fixed and opening frames.

2. Description of the Prior Art

French patent application No 88 16320 filed 12 December 1988 describes an installation for finishing opening window frames enabling the manufacture of opening window frames fitted out with their hardware, seals, glazing units and beading and ready to be mounted on the fixed frame of a window or French window.

With relatively large cross-section frames made from wood or from plastics materials, especially from PVC, as is the case in the Federal German Republic in particular, it is standard practice to work on the fixed frame and the opening frame simultaneously and in parallel, to fit them out with their hardware and seals and to assemble them together before fitting the glazing unit(s) and carrying out the subsequent operations, in particular the fitting of the beading.

Because the upright cross-sections are much larger than those of the uprights of window frames as usually employed in France, for example, the arrangement of the seal and the glazing unit are also somewhat different.

The different arrangements are schematically represented in FIGS. 1A through 1D which are cross-sections through one upright of an equipped fixed and/or opening window frame; to be more precise:

FIG. 1A is a schematic representation of a window frame, preferably wooden, the opening frame of which is fitted out with two external seals, FIGS. 1B and 1C are schematic representations of an opening window frame, preferably wooden, fitted out with spacer(s), glazing unit seals, glazing unit and beading, FIG. 1D is a schematic representation of a window frame, preferably of PVC, fitted out with an external seal on the opening frame and an external seal on the fixed frame.

FIG. 1A shows an arrangement with twin external seals on the opening frame intended in particular for wooden window frames. It is usual practice to provide only one external seal on the opening frame. The fitting of two external seals to the opening frame O makes it possible to form a larger decompression chamber and thus to obtain a better seal.

FIG. 1D shows another arrangement, specifically intended for PVC frames and also enabling the creation of a large decompression chamber. In this case there are also two seals but one is an external seal on the opening frame O and the other is an internal seal on the fixed frame D.

Another different arrangement resulting from differences between French and German practice should also be noted. In the case of a single central external seal on an opening or fixed frame in the Federal German Republic the seal is placed outside the ironmongery whereas in France the seal is fitted between the hardware and the overlap.

With relatively small opening frame cross-sections, such as are usually employed in France, for example, the glazing unit is fitted by fitting a flexible glazing unit seal, a flexible beading seal and beading. These seals are able to accommodate any play due to warping.

For larger cross-section opening frames, however, such as are generally used in the Federal German Republic, for example, the deformation play is much greater and it is necessary to associate with the flexible seal one or more non-compressible spacers (or wedges). Two typical arrangements resulting from this fact are schematically represented in FIGS. 1B and 1C.

In FIG. 1B the two non-compressible spacers are fitted at the edges of the rebate of the opening frame O and of the beading P. The remaining space between the glazing unit and the rebate and the beading P is filled by the seal in the usual way.

In FIG. 1C a single spacer is fitted at the back of the rebate of the opening frame O and the remaining space between the glazing unit, the rebate and the beading P is filled by the seal.

Until now the various operations involved in finishing opening and fixed frames have been carried out manually at separate workstations, which leads to high production costs because of the long fabrication times inherent to the manual way in which the operations are carried out. Also, the finishing work is obviously dependent on the dexterity and the conscientiousness of the operator, which can lead to prejudicial variations in the quality of the work. What is more, any modification to this traditional type of manufacture:

increases the number of workstations if an accessory or the modifications affect one type of opening or fixed frame, result in dead or down times, principally on changing the product type, due to the necessity to arrange supplies, working templates, etc, in the worst case, require modification to the layout of the workstations for different designs or where more numerous tasks are to be executed.

An object of the invention is to remedy these disadvantages by the use of an installation for finishing window frames which is as automated as possible so as to reduce as much as possible the manual operations and manipulations which are prejudicial to production costs.

SUMMARY OF THE INVENTION

The invention consists in a window frame finishing installation comprising:

automatic fixed frame finishing means, automatic opening frame finishing means, a station for assembling opening frames to fixed frames, a glazing unit fitting and fixing station and a beading fitting station.

The installation is preferably formed of two continuous lines of modular stations arranged in two parallel reference planes of which one comprises the fixed frame finishing means and the second comprises the opening frame finishing means.

To further automate the installation each workstation comprises a conveyor aligned with the conveyor of the adjacent station, transfer members passing frames from one station to another without transition.

By virtue of the automated execution of the various operations the installation in accordance with the invention makes it possible to reduce significantly the number of operators and to equip fixed and opening frames continuously from the bare frames to the complete window frame. Also, the manual manipulation operations are eliminated which eliminates dead time while making it possible to achieve total regularity in respect of finish quality.

Other characteristics and advantages will emerge from the following description and the appended drawings.

BRIEF DESCRIPTION OF THE DRAWINGS

FIGS. 1A through 1D have already been described.

FIGS. 2B and 2C taken in combination represent a plan view of the wooden frame finishing installation in accordance with the invention.

FIGS. 3B and 3C taken in combination represent a plan view of the PVC frame finishing installation in accordance with the invention.

DETAILED DESCRIPTION OF THE INVENTION

Figure 2A:
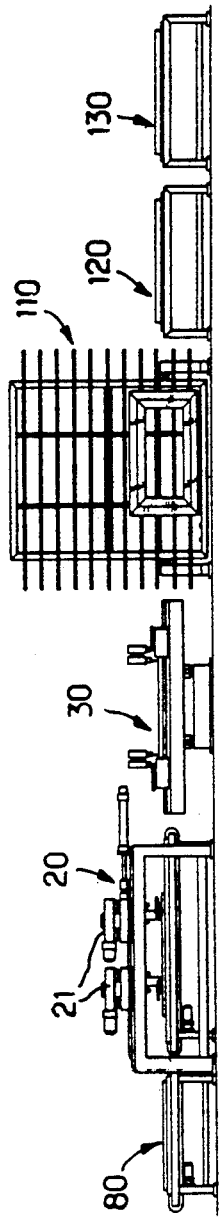
FIGS. 2A and 2B are respectively a view in elevation and a plan view of a wooden fixed frame finishing line in accordance with the invention.

As can be seen in the figures, the installation in accordance with the invention comprises automatic fixed frame finishing means, automatic opening frame finishing means, a station 110 for assembling the opening frames to the fixed frames, a glazing unit fitting and fixing station 120 and a beading fitting station 130.

FIGS. 2A through 2D show a first preferred embodiment of the frame finishing installation specifically intended for wooden frames. In this first embodiment the automatic fixed frame finishing means comprise means 20 for fitting striking plates and means 30 for fitting bearings and corner supports. The automatic opening frame finishing means comprises means 40 for fitting the external seals, means 50 for fitting the glazing unit seal and means 60 for fitting and fixing the hardware.

Figure 2B:
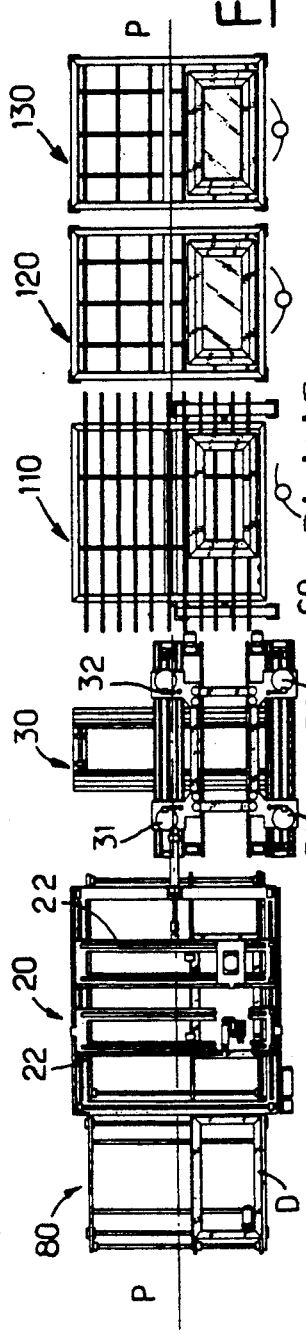
Figure 2C:
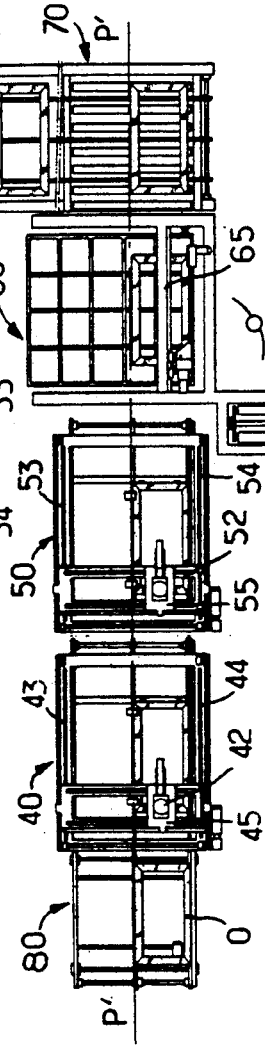
FIGS. 2C and 2D are respectively a view in elevation and a plan view of a wooden opening frame finishing line in accordance with the invention.
Figure 2D:
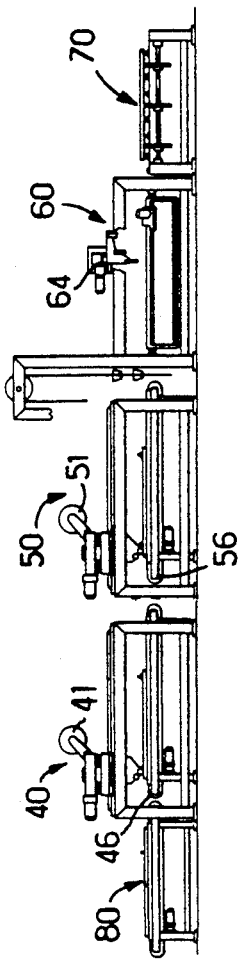
Figure 3A:
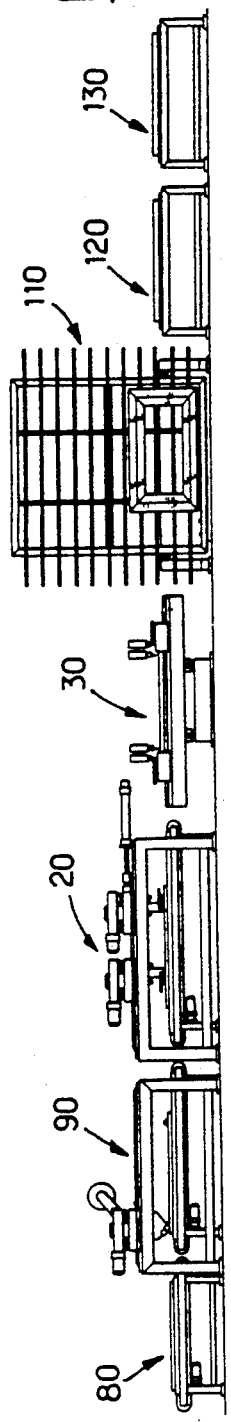
FIGS. 3A and 3B are respectively a view in elevation and a plan view of a PVC fixed frame finishing line in accordance with the invention.
Figure 3B:
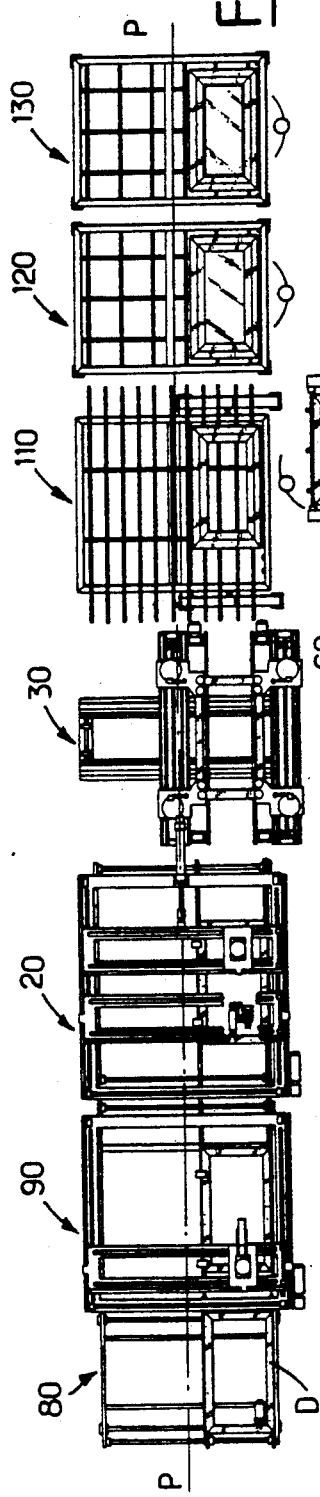
Figure 3C:
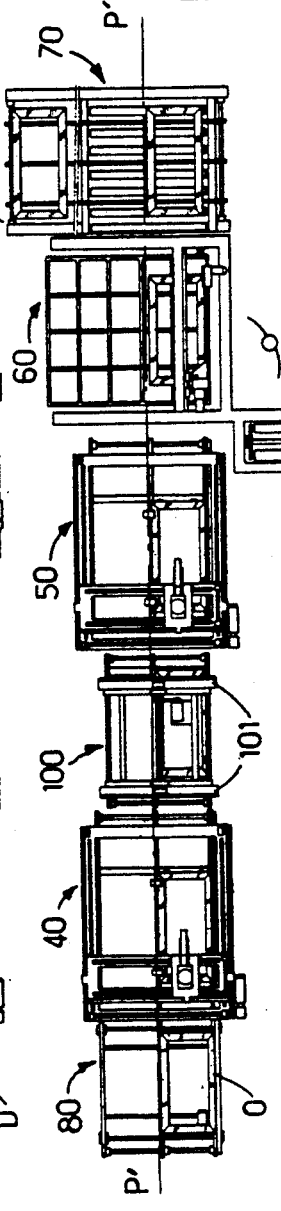
FIGS. 3C and 3D are respectively a view in elevation and a plan view of a PVC opening frame finishing line in accordance with the invention.
Figure 3D:
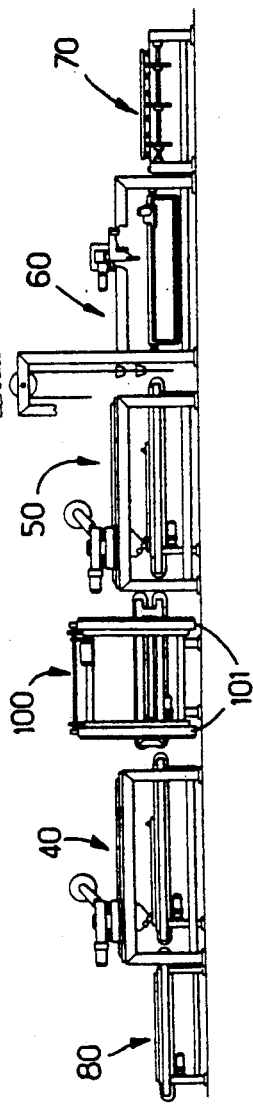

All these means are arranged in two continuous lines of modular stations in two parallel reference planes PP and P'P', the plane PP comprising the fixed frame finishing means and the plane P'P' comprising the opening frame finishing means (FIGS. 2B and 2C taken in combination).

All these stations comprise means (template tabs, proximity sensors, sensor cells, etc) for recognizing the size, material and type of the frame to be equipped.

Each finishing line comprises at its upstream end loading and dimension capture means 80 for recognizing the readied opening or fixed frame (size, material, type, mode of opening).

The downstream end of the opening frame finishing line P'P' is connected to the fixed frame finishing line PP by means of a storage and transfer station 70 facing the station 110 for assembling the opening frames to the fixed frames which is itself located in the reference plane PP, together with the glazing unit fitting and fixing station 120 and the beading fitting station 130.

This first embodiment of the installation, specifically designed for finishing wooden frames, is particularly noteworthy in that the station 40 for fitting the external seals to the opening frames can be controlled to perform two consecutive passes on the same frame. In this way opening frames such as that shown in FIG. 1A can be fitted with their seals.

What is more, the station 50 for fitting the glazing unit seals to the opening frames also fits at least one glazing unit spacer E. In this way glazing units as shown in FIG. 1B or FIG. 1C, for example, can be fitted automatically.

The stations for fitting glazing unit spacers and seals and external seals are similarly implemented. They comprise a frame, a lifting table, a spool 41, 51 from which the seal or spacer is payed out and a carriage 42, 52 movable in translation on two slideways 43, 53 and 44, 54 in the longitudinal plane of the opening frame O, this carriage paying out the appropriate length of seal or spacer and forcibly applying it to the opening frame using hydraulic or pneumatic mechanical guiding means. The carriage 42, 52 is rotatable on its carriage support 45, 55 so as to be able to follow the entire periphery of the frame.

The opening frame is transferred from one station to another by conveyor means, each station incorporating a conveyor belt or chain 46, 56 and transfer means (not shown but known in themselves) passing the opening frames from one station to another without transition. These transfer means may advantageously comprise one or more idler rollers in the gap between two consecutive stations.

The hardware fitting stations 60 comprise a frame supporting a lifting table which is moved to the required level in the usual way, by vertical piston-and-cylinder actuators, for example. Hardware insertion and fixing means are constituted as thrust and screwing means 64 mounted on a slideway 65.

The station 20 for fitting the striking plates to the fixed frame also comprises a frame and a lifting table. It comprises at least one fitting head 21 fed with striking plates and mounted on a slideway 22.

The station 30 for fitting bearings and corner supports to fixed frames preferably comprises four working heads 31, 32, 33, 34 mounted on slideways so that they can be positioned at the four corners of an opening frame O.

The station 110 for assembling the opening frames to the fixed frames, the station 120 for fitting and fixing the glazing units, the station 130 for fitting the beading and the opening frame storage and transfer station 70 are all processing and transfer stations known in themselves.

FIGS. 3A through 3D show a second preferred embodiment of the window frame finishing installation specifically intended for plastics material, for example PVC, frames.

Just like the previous installation, this installation comprises loading and dimension capture stations 80, a station 20 for fitting striking plates to fixed frames, a station 30 for fitting bearings and corner supports to fixed frames, a station 40 for fitting external seals to opening frames, a station 50 for fitting glazing unit seals to opening frames, a station 60 for fitting ironmongery to opening frames, an opening frame storage and transfer station 70, a station 110 for assembling opening frames to fixed frames, a station 120 for fitting and fixing glazing units and a station 130 for fitting beading. These various stations are similar to those already described.

The installation differs from the preceding installation in that there is provided at the start of the fixed frame finishing line PP a station 90 for fitting external seals to fixed frames. This station is similar to the stations 40, 50 and is designed to fit external seals to fixed frames D so that the latter can be fitted with a seal such as that shown in FIG. 1D.

It further comprises in the opening frame finishing line P'P' between the outer seal fitting station 40 and the glazing unit seal fitting station 50 a turning over station 100.

The turning over station 100 comprises in the known way two circular rails 101 on which rotate two belts provided with rolling means and supporting an opening frame secured by known locking means.

Although it is in this instance included in an installation specifically intended for plastic material frames, the turning over station 100 may be incorporated into the wooden frame finishing line or plastics material frame finishing line. The need for it depends on the shape of the cross-section of the opening frame. If the rebate in which at least one external seal is fitted is on the same side of the opening frame as the beading then turning over is not necessary. However, if the rebate and the beading are on opposite sides (as in FIGS. 1A through 1C) the opening frame must be turned over between the station 40 fitting the external seal and the station 50 fitting the glazing unit seal.

The installation may also comprise an additional beading seal fitting station and/or means for fitting drip moldings between the frame section and the beading.

There is claimed:

1. An apparatus for the manufacture of window frame assemblies from unequipped opening frames and unequipped fixed frames comprising:
   (a) first receiving means for receiving said unequipped fixed frames;
   (b) first fitting means for automatically fitting said unequipped fixed frames with hardware and seals;
   (c) second receiving means for receiving said unequipped opening frames;
   (d) second fitting means for automatically fitting said unequipped opening frames with hardware and seals; and
   (e) assembly means for assembling opening frames equipped with hardware and seals to fixed frames equipped with hardware and seals.

2. The apparatus according to claim 1, wherein said first fitting means comprises means for automatically fitting striking plates to the fixed frames and means for automatically fitting bearings and corner supports to the fixed frames.

3. The apparatus according to claim 1, wherein said second fitting means comprises means for automatically fitting external seals to the opening frames, means for automatically fitting glazing unit seals to the opening frames and means for automatically fitting hardware to the opening frames.

4. The apparatus according to claim 3, wherein said second fitting means further comprises means for automatically turning over said opening frames located between said means for automatically fitting external seals and said means for automatically fitting glazing unit seals.

5. The apparatus according to claim 3, wherein said means for automatically fitting external seals to the opening frames performs two consecutive passes on an opening frame.

6. The apparatus according to claim 5, wherein said means for automatically fitting glazing unit seals to the opening frames further includes means for automatically fitting at least one glazing unit spacer to each of said opening frames.

7. The apparatus according to claim 6, wherein said first fitting means includes means for automatically fitting an external seal to said fixed frames.

8. The apparatus according to claim 1, further comprising means for automatically determining the size, material and type of said unequipped opening frames and said unequipped fixed frames received by said apparatus.

9. The apparatus according to claim 8, wherein said means for determining comprises template tabs, proximity sensors and sensor cells.

10. The apparatus according to claim 1, wherein said apparatus comprises a first line of modular stations comprising an upstream end and a downstream end, and a second line of modular stations comprising an upstream end and a downstream end, said first line of stations arranged parallel to said second line of stations,
    said first line of stations including said first receiving means, said first fitting means downstream of said first receiving means, and said assembly means downstream of said second fitting means, and
    said second line of stations including said second receiving means and said second fitting means downstream of second receiving means.

11. The apparatus according to claim 10, further comprising first identification means for automatically identifying dimensions of the unequipped fixed frames received by said apparatus located near the upstream end of said first line of stations.

12. The apparatus according to claim 11, further comprising second identification means for automatically identifying dimensions of the unequipped opening frames received by said apparatus located near the upstream end of said second line of stations.

13. The apparatus according to claim 10, wherein said second line of stations further comprises near the downstream end thereof transfer means for transferring said opening frames equipped with hardware and seals to said second line of stations, said transfer means opposed to a portion of said first line of stations including said assembly means.

14. The apparatus according to claim 10, wherein each station in said first and second line comprises a lifting table levelled by piston-and-cylinder actuators.

15. The apparatus according to claim 10, wherein each station in said first and second lines comprises a conveyor aligned with an adjacent station and station transfer means for transferring an opening frame or a fixed frame to an adjacent downstream station.

16. The apparatus according to claim 10, wherein said first line of stations further comprises means for automatically fitting a glazing unit to opening frames assembled to fixed frames and a station including means for automatically fitting a beading to opening frames assembled to fixed frames, each of which are downstream of said assembly means.

17. The apparatus according to claim 1, wherein said second fitting means includes a carriage for applying a seal around an entire periphery of an opening frame, said carriage rotatably mounted to a support.

* * * * *